United States Patent
Lewis et al.

(10) Patent No.: US 6,227,428 B1
(45) Date of Patent: May 8, 2001

(54) HOUSING FOR A VEHICLE JACKING DEVICE

(75) Inventors: Stephen J. Lewis, Harrison Township; Bruce P. Mattarella, Canton; Zlatko B. Stojkovic, Brownstown; Joseph J. Savalle, South Lyon, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/432,030

(22) Filed: Nov. 2, 1999

(51) Int. Cl.$^7$ .................................................. B60R 7/00

(52) U.S. Cl. .................. 224/557; 224/402; 224/404; 224/539; 224/543; 414/462; 296/37.13

(58) Field of Search .................................... 224/402, 403, 224/404, 539, 542, 543, 557; 414/462, 463; 296/37.13

(56) References Cited

U.S. PATENT DOCUMENTS

| 4,249,685 |   | 2/1981 | Sawby . |
|-----------|---|--------|---------|
| 4,586,696 | * | 5/1986 | Mugford et al. .............. 296/37.13 X |
| 4,750,774 |   | 6/1988 | Pickering . |
| 5,288,000 |   | 2/1994 | Adamson . |
| 5,893,494 |   | 4/1999 | Charton . |
| 5,894,974 |   | 4/1999 | Jensen . |

* cited by examiner

Primary Examiner—Stephen K. Cronin
(74) Attorney, Agent, or Firm—Kenneth H. Maclean

(57) ABSTRACT

A housing for the retention, stowage and trim of a vehicle jacking device is herein disclosed. The housing along with the vehicle jacking device comprise the jack assembly which may be disposed within the internal compartment of the vehicle or the outside of a vehicle. The housing conforms to the shape of the vehicle jacking device and includes a movable door for covering a portion of the housing and an adjuster screw for extending and retracting the telescopic post member of the jack.

12 Claims, 2 Drawing Sheets

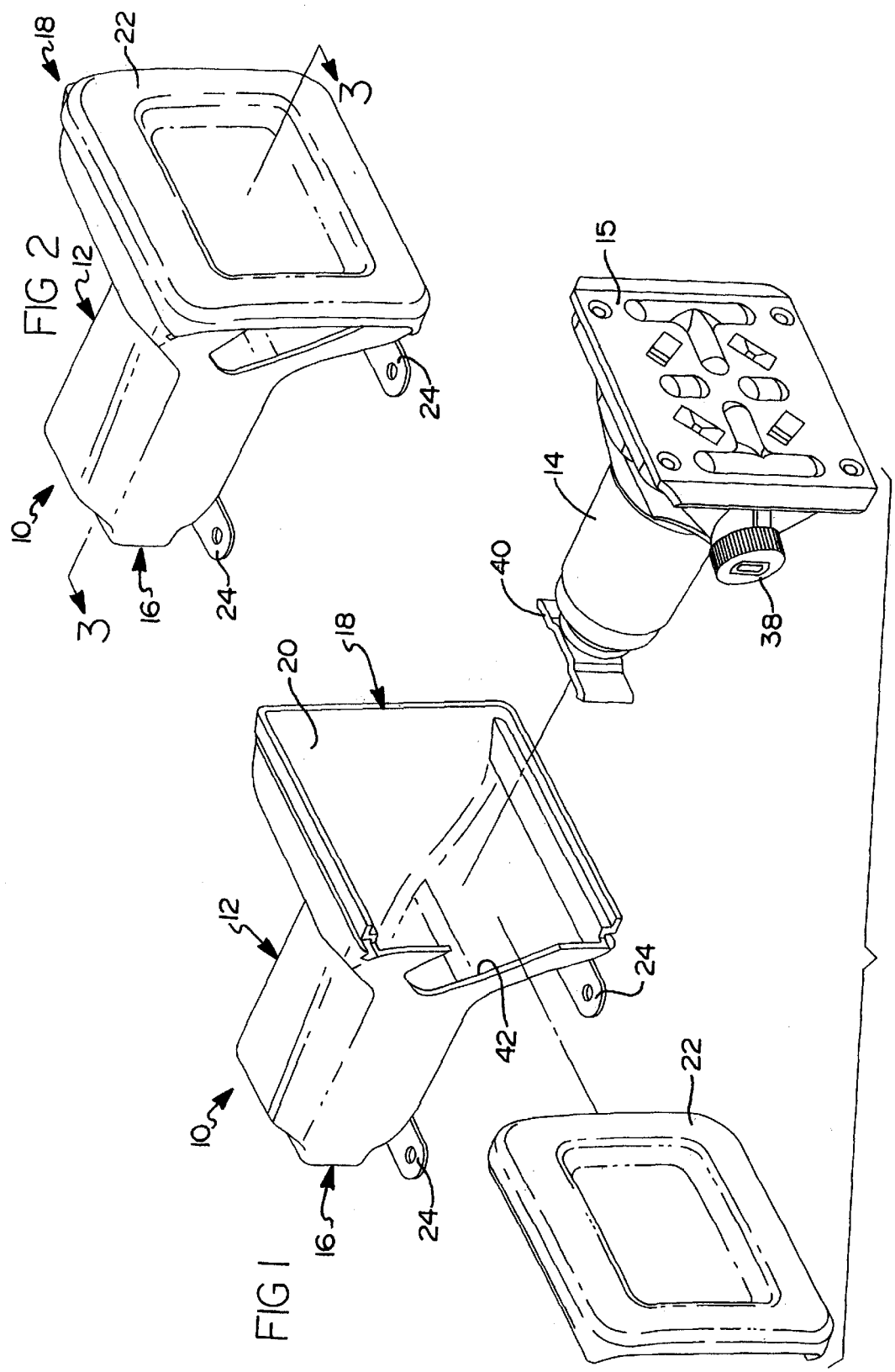

HOUSING FOR A VEHICLE JACKING DEVICE

FIELD OF THE INVENTION

The present invention relates generally to a jack assembly and more particularly to a jack assembly having a housing for the retention, stowage and trim of a vehicle jacking device.

BACKGROUND

The availability of a jack within a motor vehicle allows the operator to utilize the jack when the vehicle must be elevated for removing a wheel. The location of a jack within a vehicle is typically within the trunk or an internal compartment of a vehicle. The convenience of having a jacking device present within a motor vehicle eliminates the need to contact alternate transportation upon being stranded due to a flat tire, or any other sort of emergency which requires the use of the jacking device. Thus, it would be desirable to have a designated housing or apparatus for conveniently storing the jacking device within the vehicle, so that the jacking device is always available.

The housing for the jacking device provides the ability to stow the jack in a retractable form in addition to securing the jacking device. By having a designated area for the jacking device, the jacking device would be consistently available to the operator when needed. In addition, having a designated location for a vehicle jacking device ensures that the operator of the vehicle is more likely to keep the jack within the vehicle instead of taking it out of the vehicle to provide additional space. Another problem with having a non-secured jacking device within the vehicle is the potential noise and rattling the jacking device can make during operation of the vehicle.

Accordingly, it is desirable to provide a housing which can be mounted within the motor vehicle for securing the vehicle jacking device and reducing the amount of noise that occurs during operation of the vehicle. It is further desirable to provide a housing for the vehicle jacking device which prevents other objects stored in proximity to the housing from contacting the jacking device.

SUMMARY OF THE INVENTION

In particular, the present invention relates to a jack assembly for a vehicle jacking device comprising a housing, a jack which can be placed within the housing, a movable door for covering a portion of the housing and an adjuster screw which is located on the jack and utilized for extending and retracting a telescopic post member of the jacking device. The adjustment of the telescopic post member of the jack while in the housing allows the jack to be firmly secured within the housing, therefore decreasing the potential for noise during operation of the motor vehicle. In addition, the housing includes mounting tabs, allowing the housing to be attached to the motor vehicle.

The housing of the jack assembly is comprised of a moldable material which conforms to the outline and shape of the jack disposed within the housing. Following the placement of the jack within the housing, a movable door is slidingly engaged over the open end of the housing. As a result, the housing provides a complete encasement of the vehicle jacking device. Located on the housing is a slot which provides the access to the adjustment screw of the jack device. Once a jack is disposed within the housing device and the movable door is slidingly engaged over the open end of the housing, the adjuster screw can be rotated in a first or second direction to either extend or retract the telescopic post member of the jacking device.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is an exploded perspective view of the components of the jack assembly in accordance with a preferred embodiment of the present invention;

FIG. 2 is a perspective view of the housing wherein the movable door has been engaged with the open end of the housing;

DETAILED DESCRIPTION OF THE INVENTION

Figure 3:
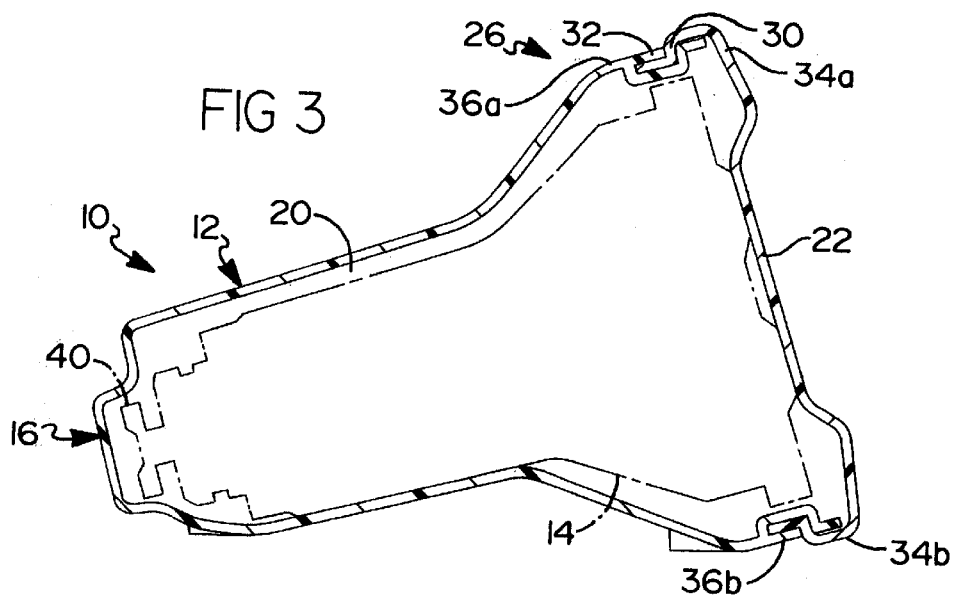
FIG. 3 is a cross-sectional view of the housing along the section line 3–3 referenced in FIG. 2 with the jack shown in broken line.

Referring now to FIG. 1 which is an exploded perspective view of the components of the jack assembly 10, the housing 12 of the jacking device 14 is shown to include a plurality of sides, preferably four, which conform the outline and shape of the jacking device 14. In addition to the plurality of sides, the housing includes a first closed end 16 and a second open end 18. The first end 16 of the housing 12 is smaller than the second end 18. The second end 18 of the housing 12 is open and larger due to the fact that it must accommodate the size and shape of the base 15 of the jacking device 14. It is through the second open end 18 of the housing 12 that the jacking device 14 is inserted into the internal compartment 20 of the housing 12. Upon stowing the jacking device 14 within the housing 12, a movable door 22 may be engaged and slidably interlocked with the open end 18 of the housing 12. The housing 12 and movable door 22 are preferably formed from a moldable plastic material.

With particular reference to FIG. 2, the housing 12 is shown assembled. The housing 12 includes the movable door 22 slidably interlocked with the housing 12. Located on the outside of the housing 12 is a plurality of mounting tabs 24 which enable the housing 12 or jack assembly 10 to be attached to either the inside or the outside of the vehicle. Preferably, housing 12 includes four mounting tabs 24. Mounting of the jack assembly 10 can be performed in a number of ways which include the use of snaps, screws, adhesives or any other type of mounting apparatus available to those of ordinary skill in the art.

Along the section line 3—3 of FIG. 2 one can see a cross-sectional view shown in FIG. 3 of the jack assembly 10, wherein the jacking device 14 (shown in broken line) is disposed within the internal compartment 20 of the housing 12. The housing 12 of the jack assembly 10 reflects the shape of the jacking device 14. Therefore, the jacking device 14 fits snugly within the internal compartment 20 of the housing 12. Moreover, once the movable door 22 is interlocked with the housing 12, the jacking device 14 is substantially enclosed within the housing 12. The enclosed jack assembly 10 insures the secure retention of the jacking device 14 within the housing 12. A more detailed view of the interlocking device 26 used to connect the housing 12 and the movable door 22 is shown in FIG. 4.

Figure 4:
FIG. 4 is an enlarged view of the interlocking device used to attach the movable door to the housing.

FIG. 4 discloses the interlocking device 26 and more specifically, a tongue and groove attachment configuration between the movable door 22 and the housing 12 of the jack assembly 10. The movable door 22 may be slidably interlocked with the housing 12. As shown in FIG. 4, the movable door 22 contains the tongue portion 30 of the tongue and groove attachment, and the housing 12 contains the groove portion 32. Although a tongue and groove attachment 26 is used for securing the door 22 to the housing 12, many different types of attachments may be utilized. This may include snaps or other types of removable attachment devices. Moreover the interlocking device 26 utilized is formed along two edges 34a and 34b of the movable door 22, and formed along the corresponding edges of the housing 36a and 36b. The interlocking device 26 disposed on two parallel edges insures the ability to have the movable door 22 and housing 12 slidably interlockable.

Figure 5:
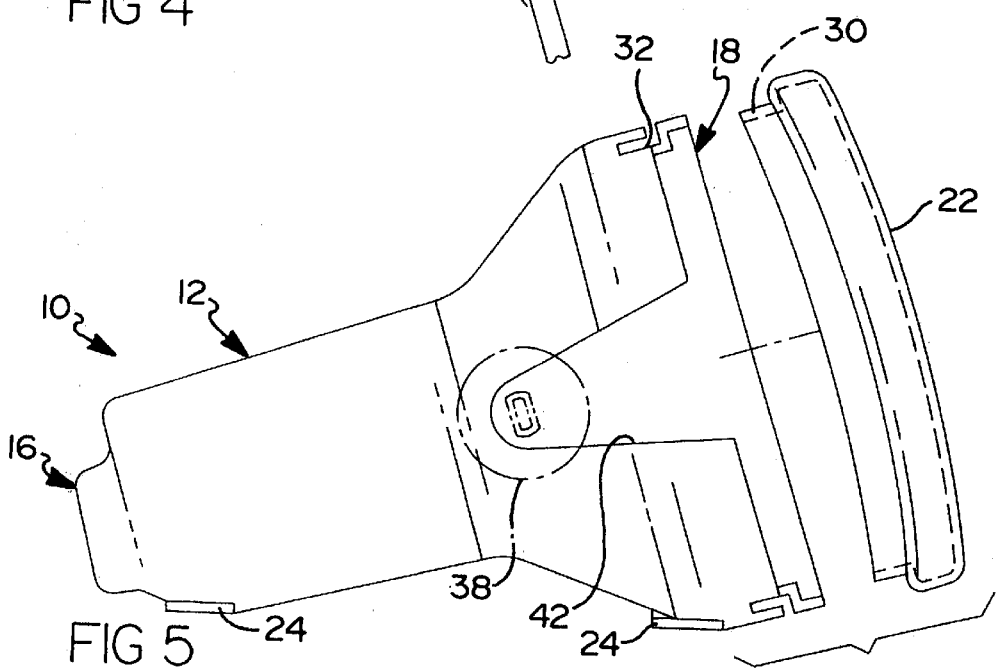
FIG. 5 is a side elevational view of the housing showing the adjuster screw positioned within the slot provided by the housing and showing the relative position of the movable door.

To insure that the jacking device 14 stowed within the internal compartment 20 of the housing 12 is snugly engaged within the internal compartment 20, an adjuster screw 38 on the jacking device 14 allows for the extension of the telescopic post member 40. As shown in FIG. 5, while stowing the jacking device 14 within the internal compartment 20, the adjuster screw 38 located on the jacking device 14 is slid within the adjuster screw slot 42 provided on one side of the housing 12. The adjuster screw slot 42 allows the adjuster screw 38 to be accessible by the operator of the vehicle. Once the jacking device 14 is placed within the internal compartment 20 of the housing 12 and the movable door 22 is slidably interlocked, the adjuster screw 38 may be rotated to insure the jacking device 14 is snugly fit within the internal compartment 20 of the housing 12. Upon rotation of the adjuster screw 38 in a first direction, the telescopic post member 40 is extended. The extension of the telescopic post member 42 insures that the jacking device 14 is held tightly between the closed end 16 and the movable door 22, within the internal compartment 20. As a result, movement of the jacking device 14 within the housing 12 is not possible. Additionally, any dirt or grease on the jacking device 14 is isolated from contacting other objects stored in proximity to the housing 12.

Referring back to FIG. 3, it can also be seen that upon the extension of the telescopic post member 40, the jacking device 14 can be extended to securely fit within the housing 12 of the jack assembly 10. In order to retract the telescopic post member 40, the adjuster screw 38 may be rotated in a second direction which retracts the telescopic post member 40 and allows the movable door 22 to be disengaged from the housing 12 of the jack assembly 10. The jacking device 14 can then be removed from the housing 12.

The invention being thus described, it will be apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A jack assembly for stowing a vehicle jacking device comprising:

a housing defining an internal compartment, said vehicle jacking device being disposed within said housing; and a moveable door for covering a portion of said housing;

wherein said housing is further comprised of a moldable material having a first end and a second end;

wherein said first end is closed and said second end is open;

wherein said moveable door further includes means for slidably interlocking with said second end of said housing.

2. The jack assembly according to claim 1 wherein said means for slidably interlocking said moveable door with said second end of said housing is a tongue and groove attachment.

3. A jack assembly for stowing a vehicle jacking device comprising:

a housing defining an internal compartment, said vehicle jacking device being disposed within said housing; and a moveable door for covering a portion of said housing;

wherein said housing is further comprised of a moldable material having a first end and a second end;

wherein said first end is closed and said second end is open;

wherein said moveable door is attached to said second end of said housing by an interlocking device;

wherein said interlocking device is a tongue and groove attachment.

4. A housing for a jack comprising;

an internal compartment for receiving the jack;

a first end and a second end, said first end being smaller than said second end;

a plurality of mounting tabs, said mounting tabs being fixed to an outside surface of said housing;

a slot for receiving an adjuster screw located on said jack;

a moveable door for slidably interlocking said second end of said housing; and a groove along two edges of said second end, wherein a moveable door is slidably interlockable with said housing.

5. The housing of claim 4 wherein said internal compartment conforms to the shape of the jack being disposed within said housing.

6. The housing of claim 4 wherein said adjuster screw is positioned within said slot.

7. The housing of claim 4 wherein said adjuster screw can be rotated in a first direction and a second direction.

8. The housing of claim 7 wherein rotation of said adjuster screw in said first direction extends a telescopic post member of said jack.

9. The jack assembly of claim 7 wherein rotation of said adjuster screw in said second direction retracts a telescopic post member of said jack.

10. A method of stowing a vehicle jack comprising:

providing a housing, said housing having an open end and a closed end;

providing a movable door;

retracting a telescopic post member on the vehicle jack;

inserting said vehicle jack into said housing through said open end;

slidably interlocking said moveable door with said housing; and extending said telescopic post member on said jack.

11. The method of claim 10 wherein the step of slidably interlocking said movable door with said housing further comprises the utilization of a tongue and groove attachment.

12. The method of claim 10 wherein the step of extending the telescopic post member on the jack further comprises rotating an adjuster screw disposed on said jack.

* * * * *